June 26, 1923.
S. KRAMER
VEHICLE WHEEL
Filed July 8, 1921
1,459,736
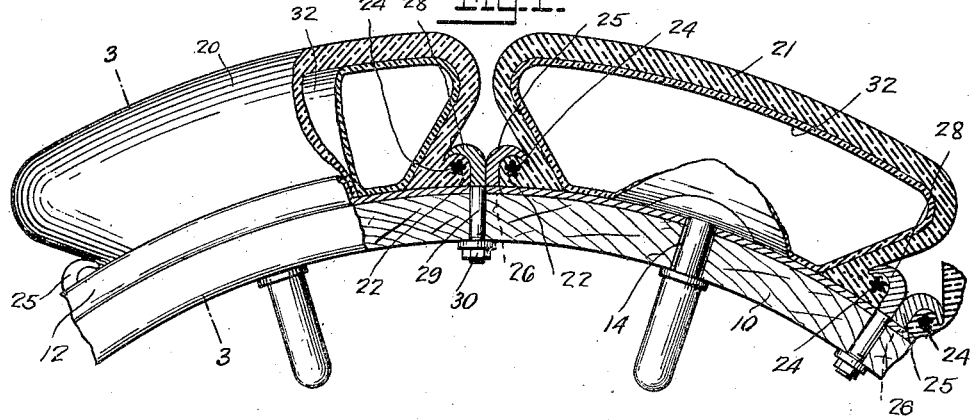
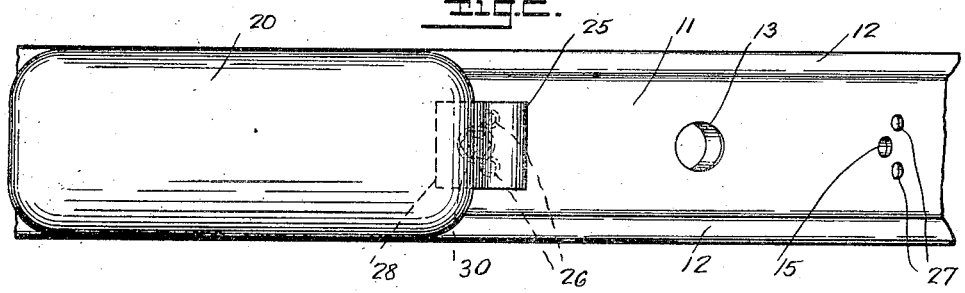
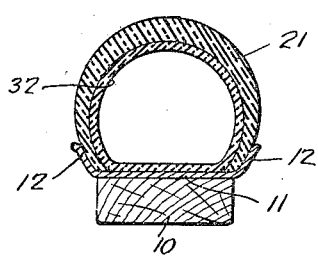
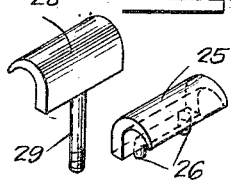
Inventor
Samuel Kramer
By his Attorney
Fedk C Fischer Patented June 26, 1923.

UNITED STATES PATENT OFFICE.

1,459,736

SAMUEL KRAMER, OF NEWARK, NEW JERSEY.

VEHICLE WHEEL.

Application filed July 8, 1921. Serial No. 483,198.

*To all whom it may concern:*

Be it known that I, SAMUEL KRAMER, a citizen of the United States, residing at Newark, in the county of Essex and State of New Jersey, have invented new and useful Improvements in Vehicle Wheels, of which the following is a specification.

One of the objects of this invention is to provide a rim and tire that are adapted for use on the wheels of vehicles usually supplied with pneumatic tires.

Another object is the provision of means for securing to a rim, a plurality of inflatable tire elements, each of these elements being provided with an air valve of usual design.

A further object is the means provided for supporting the individual tire sections and preventing side displacement.

These and other objects are attained by the novel construction and arrangement of parts hereinafter described, and shown in the accompanying drawing, forming a material part of this disclosure and in which:—

Figure 1 is a fragmental partial sectional view showing the tire sections assembled and clamped to a rim.

Figure 2 is a top plan view of the same with one section removed.

Figure 3 is a transverse sectional view taken on the line 3—3 of Fig. 1.

Figure 4 is a perspective view of the clamping elements.

Referring to the figures in detail, the numeral 10 designates the felly of a wheel, to which is attached a metal rim 11 having angularly upturned side flanges 12, and provided with radially disposed centrally positioned annular openings 13, alinable with similarly positioned openings through the felly 10, receptive of a valve stem 14 passing therethrough, another series of spaced openings 15 through the rim and felly are provided for clamp bolts.

Tire sections generally designated by the numeral 20 comprise an oblong rectangularly shaped casing 21 of arcuate cross section, the lower ends being of restricted length and provided with outwardly projecting beads 22 interiorly of which are moulded metallic elements 24, forming reenforcements therein and furnishing a comparatively solid bead adapted to engage the hook shaped clamp 25 rigidly secured by rivets 26 passing through holes 27 in the rim 11.

Adjacent the clamp 25 and engaging a similarly constructed bead formed upon another tire section, is a removable hooked clamp 28 having a stem 29 adapted to pass downwardly through the holes 15 in the rim 11, the stem 29 being screw threaded and engaged by a nut 30, thus the clamp 28 is drawn down on the bead 22, substantially securing the tire section to the rim.

The inner tubes 32 are formed and shaped in a manner adapted to fit within the tire sections and are provided individually with pneumatic tire valves of ordinary pattern, thereby permitting inflation of any unit or air may be allowed to escape and a section removed and replaced without disturbing any of the other units.

This is accomplished by releasing the stem 29, raising the element to be removed, allowing it to turn in the manner of a hinge in the fixed clamp 25 until it is released and can be removed.

Obviously the elements are inserted in a similar but reversed manner.

From the foregoing it will be seen that a simple device for this purpose has been disclosed in the preferred form of its embodiment, but it is not desired to restrict the details to the exact construction shown, it being obvious that changes, not involving the exercise of invention, may be made without conflicting with the scope of the appended claims.

1. A vehicle wheel tread comprising, in combination with the felly and channelled rim, a plurality of segmental shoes provided with undercut ends disposed on said rim between the flanged sides thereof, an inflatable element in each shoe, independent inlet valves for each inflatable element, said valves extending through said rim and felly, means fixed to said rim for engaging one of the undercut ends of said shoes and means removably engaging said rim and felly for clamping the opposite undercut ends of said shoes.

2. A vehicle wheel tread comprising, in combination with the felly and channeled rim, a plurality of segmental shoes adapted to rest in said channelled rim circumferentially, said shoes being undercut at their ends, reinforced beading formed at the undercut ends of said shoes, hook shaped clamps fixed in said rim engageable with said beadings at one end of the shoes, similar clamps removably engaging the opposite beadings, means for holding the last named clamps in adjustment, and independent means for inflating said shoes.

3. A vehicle wheel tread comprising in combination with a tire, a plurality of independent inflatable elements arranged circumferentially on the tire of the wheel, said elements having overhanging ends, beadings formed with each end of said elements at their bases, elongated hooks set transversely in the tire receptive of the beading at one end of said elements, bolts passing through said tire and hook beads on said bolts engageable with the beadings on the opposite ends of said elements, the backs of said hooks and said beads being normally in juxtaposition.

This specification signed and witnessed this 6th day of July, 1921.

SAMUEL KRAMER.

Witnesses:
FRED'K C. FISCHER,
F. NOLL.